June 27, 1939.   J. W. PAGE   2,164,120
WALKING MECHANISM
Filed Dec. 14, 1938   4 Sheets-Sheet 4
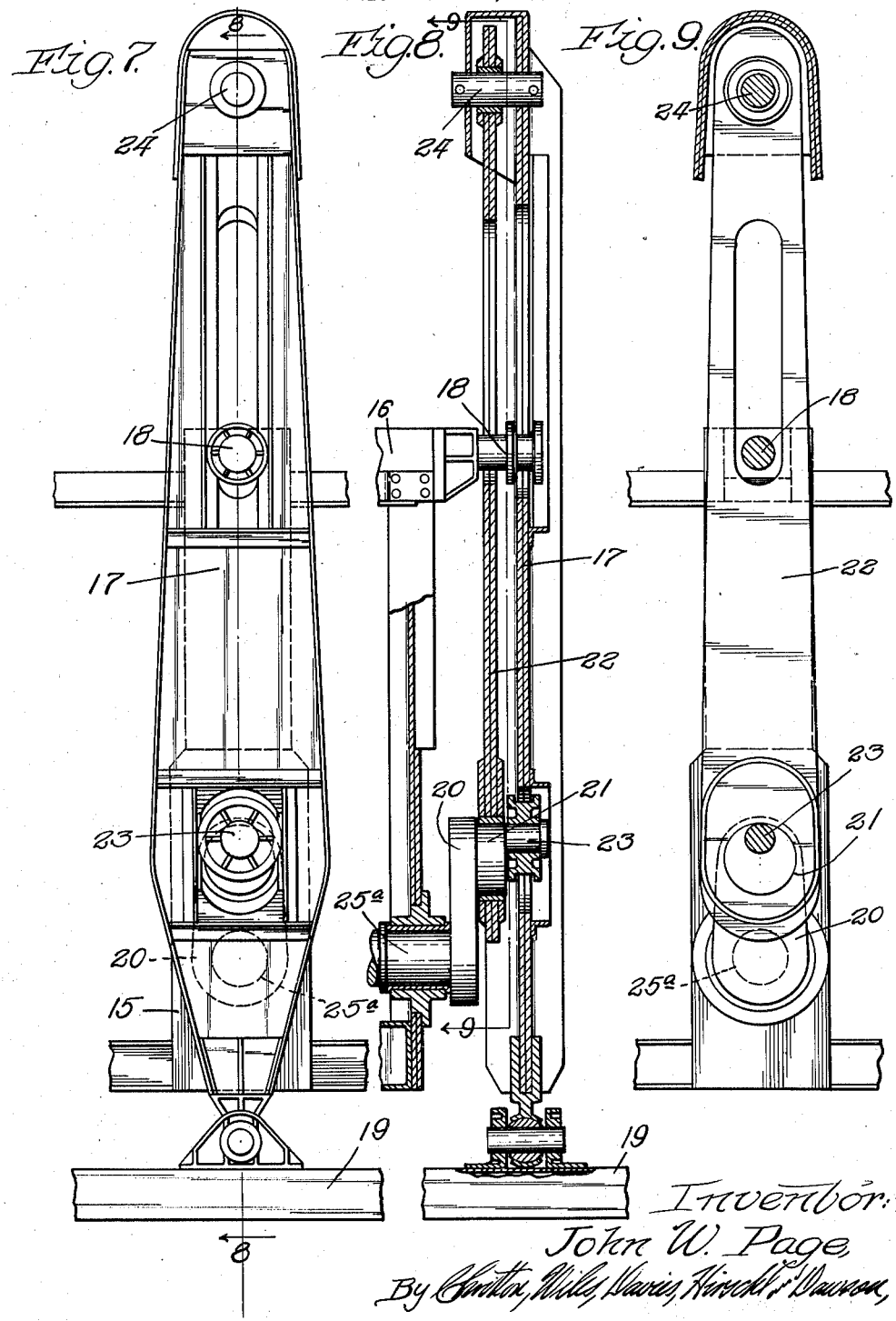

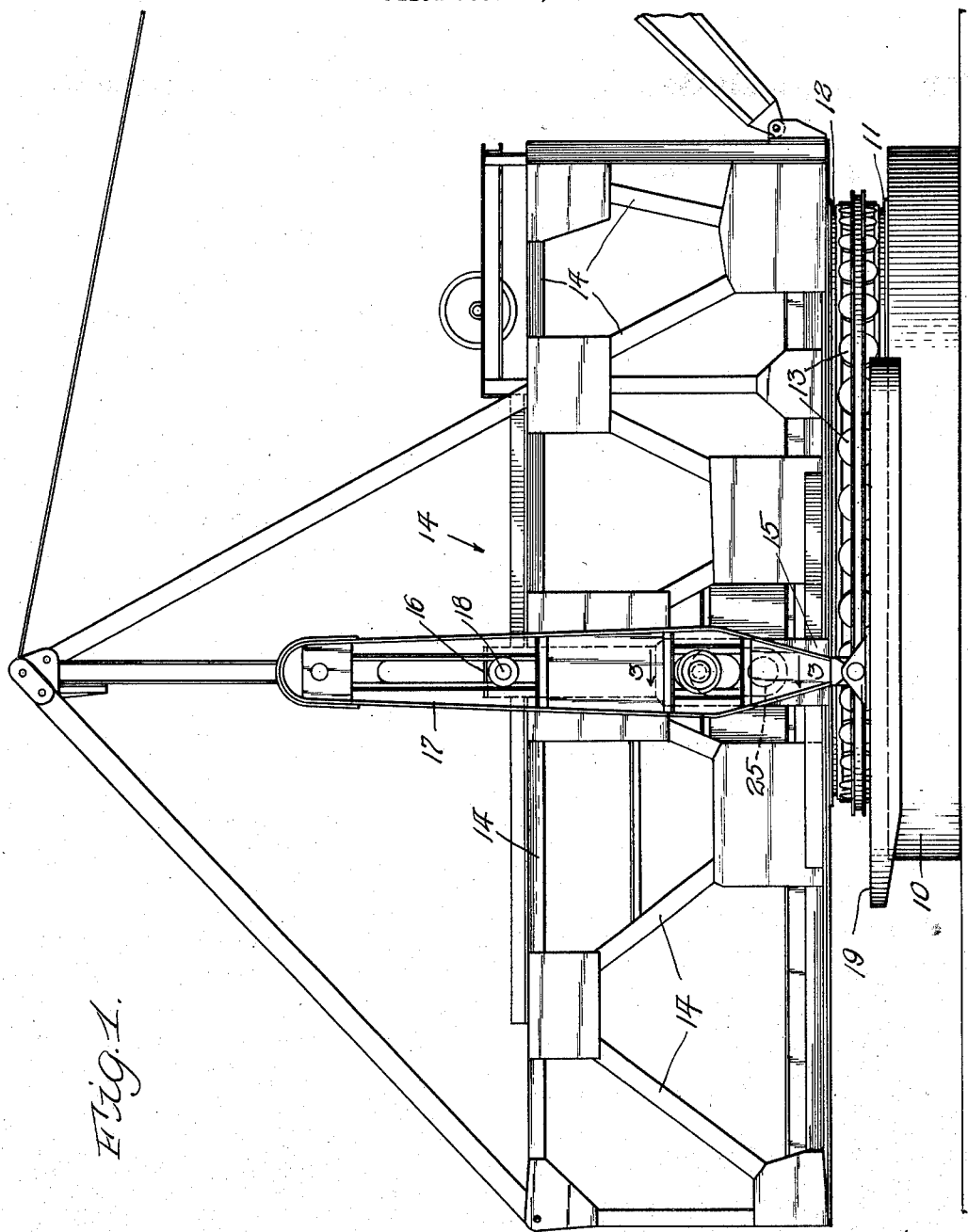

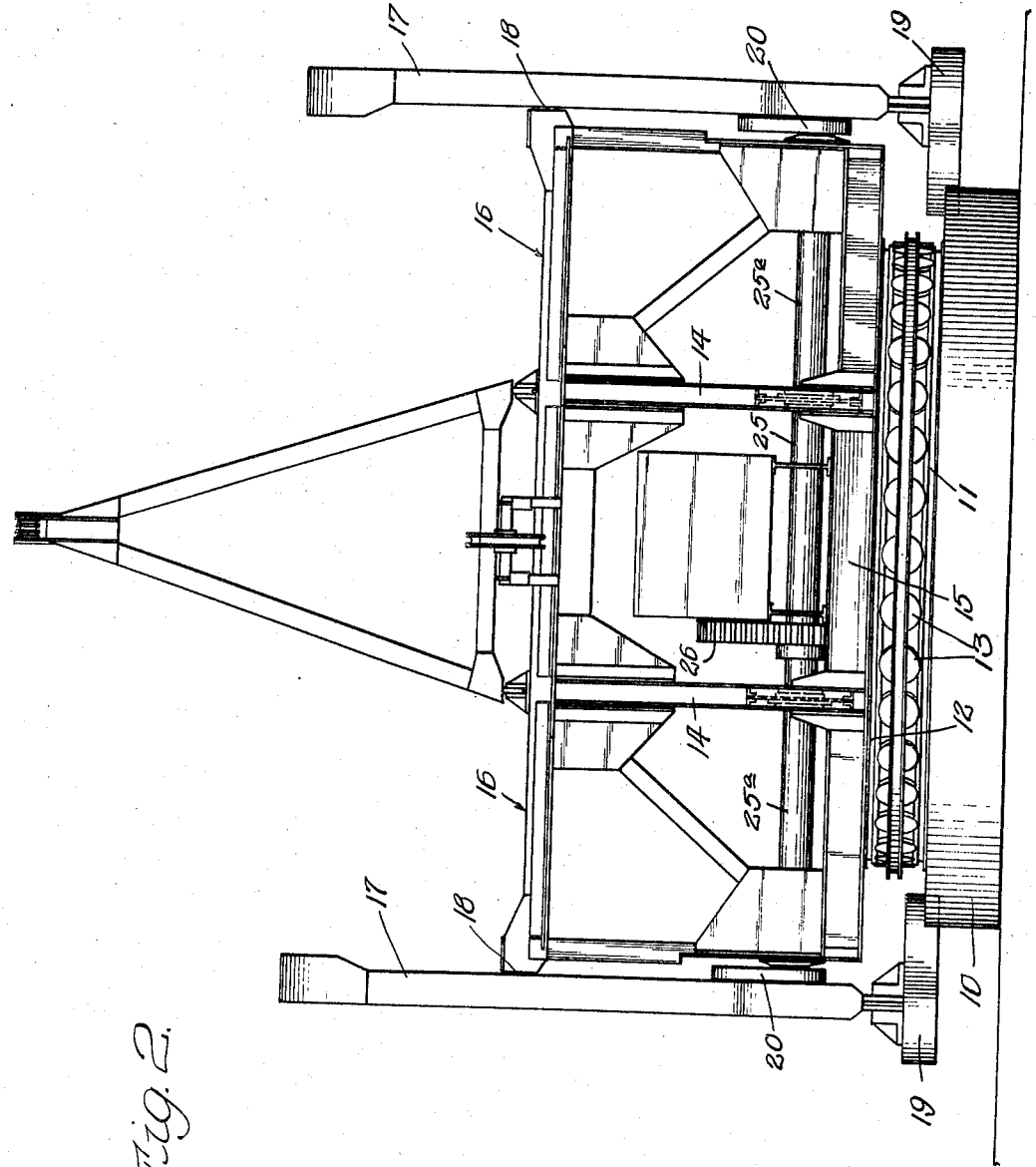

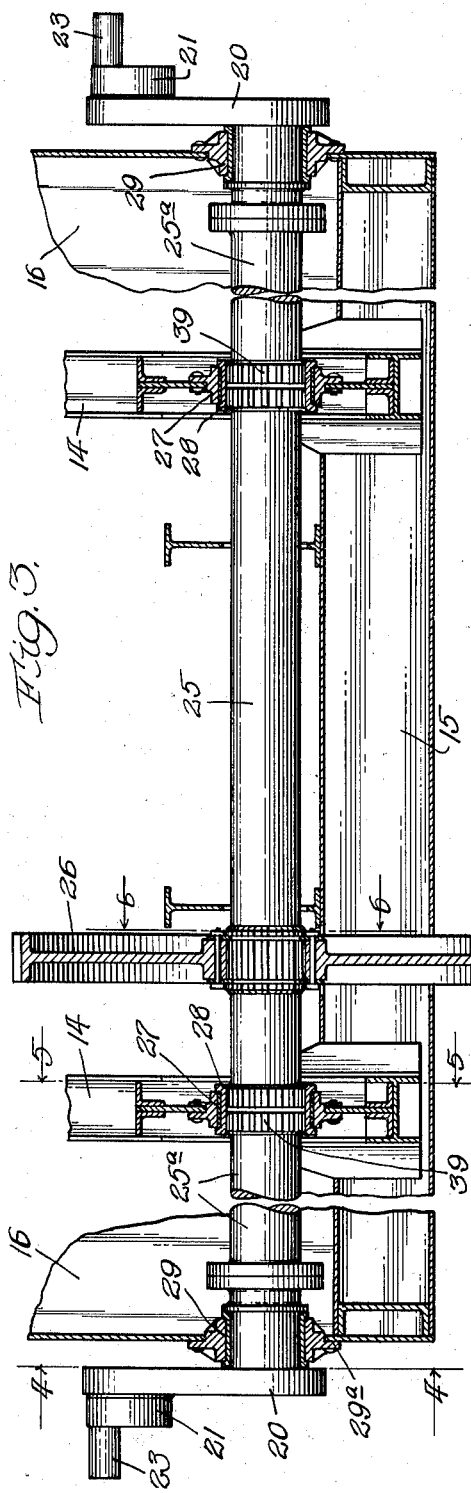
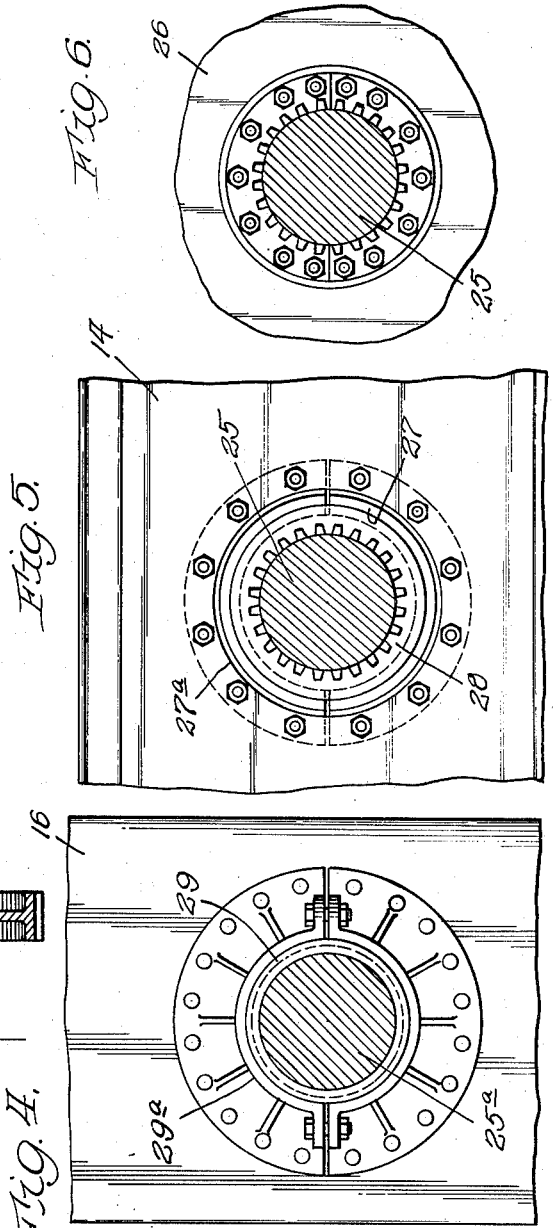

Patented June 27, 1939

2,164,120

UNITED STATES PATENT OFFICE 2,164,120

WALKING MECHANISM

John W. Page, Chicago, Ill., assignor to Page Engineering Company, Chicago, Ill.

Application December 14, 1938, Serial No. 245,734

3 Claims. (Cl. 180—8)

This invention relates to improvements in walking mechanism and more especially such mechanism adapted for use in connection with excavating, digging and material handling and driving machinery and apparatus, such as, for example, dredges, diggers, dragline buckets, scrapers, pile-drivers, and other devices using heavy machinery.

The invention pertains particularly to the walking mechanism of such devices equipped with a transverse driving shaft operating propelling members at the sides thereof. For the purpose of illustrating the invention I have here shown it embodied in a mechanism propelled by vertically slidable and swingable legs at the sides as disclosed in my copending application, Serial No. 84,205, filed June 8, 1936.

Among the features of my invention is the provision of a jointed shaft with two inside bearings mounted in the longitudinal trusses carrying the supports for the machinery or machinery platform and two outside bearings carried by structural steel outriggers. The shaft comprises three sections with adjacent ends splined into the rotatable bearing rings to connect them non-rotatively. The stationary bearing rings are split to permit their removal. The outer shaft portions can be readily withdrawn from the sides for replacement and repair purposes and to aid in preparing the apparatus for shipment.

Other features and advantages of my invention will appear more fully as I proceed with my specification.

In that form of device embodying the features of my invention shown in the accompanying drawings, Fig. 1 is a view in side elevation; Fig. 2 is a view in front elevation; Fig. 3 is a view taken as indicated by the line 3 of Fig. 1; Fig. 4 is a view taken as indicated by the line 4 of Fig. 3; Fig. 5 is a view taken as indicated by the line 5 of Fig. 3; Fig. 6 is a view taken as indicated by the line 6 of Fig. 3; Fig. 7 is a view in side elevation of one of the legs or propelling members; Fig. 8 is a view taken as indicated by the line 8 of Fig. 7; and Fig. 9 is a view taken as indicated by the line 9 of Fig. 8.

As shown in the drawings, the device comprises in general a circular main base 10 upon which the superstructure is rotatably mounted by means of the usual circular tracks 11 and 12 and rollers 13.

The superstructure includes in general suitable trusses and bridge work to form a support for the machinery to be carried by the walking mechanism. Such machinery is not shown here as it forms no part of the present invention. As here shown, the superstructure includes the two longitudinal trusses indicated in general by 14, 14. These trusses carry transverse members such as indicated by 15, 15 on which the machinery or machinery supporting platform (not shown) may be mounted by any suitable means.

At the sides of the longitudinal trusses 14, 14 are provided detachable structural steel frames or outriggers 16, 16 which carry the outer bearings for the transverse driving shaft. The outriggers are made detachable (by means not shown) to permit their ready removal; and the center portion may be made narrow enough to permit of its being loaded on a flat car for transportation. To prepare the apparatus for shipment, after the legs are removed, the outer sections of the shaft may be readily withdrawn from the sides and the outriggers removed.

The propelling means or legs are shown in Figs. 7, 8 and 9 but these need not be described in detail because their construction and operation is fully explained in my copending application referred to above. It will suffice to say that there is provided at each side a vertical leg 17 slidably and swingably mounted on the pivot pin 18 carried by the superstructure. Each leg carries a foot or auxiliary base 19 at its lower end. At the end of the driving shaft is a crank 20 with a crank pin 21 operating through the link 22 to raise and lower the leg. The crank carries a second crank pin 23 on a slightly longer radius serving to swing the leg on its pivotal connection 24 to the link at the upper end. By this construction, rotation of the shaft serves alternately to raise, lower and advance the legs and main base. The legs act together.

The driving shaft comprises a center section 25 and two outer sections 25a, 25a. The shaft may be driven in any suitable manner as by means of a pinion 26 mounted on the center section.

Each of the longitudinal trusses 14 supports a bearing including an outer stationary ring 27 carrying an inner rotatable ring 28 in which the adjacent ends of the inner and outer shaft sections are splined by means of the splines 39. This serves to connect the shaft sections non-rotatively and give the entire shaft bearing supports in the trusses 14, 14. The outer shaft sections find bearing supports for their outer ends in the bearings 29, 29 carried by the outriggers 16, 16.

The outer stationary parts 27a and 29a of the bearings 27 and 29, respectively, are split (see Figs. 4 and 5) and bolted to the web plates of the truss 14 and outrigger 16, respectively, to permit their ready removal.

Lateral movement of the shaft is prevented by the outer bearings at the crank ends. After loosening or removing the outer bearings or outriggers the outer shaft sections can be simply withdrawn from the splined bearing rings 28, 28, without disturbing the bearings.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

What I claim as new, and desire to secure by Letters Patent, is:

1. Apparatus of the character described, including: a main base; a machinery supporting superstructure mounted thereon with longitudinal trusses; propelling members at the sides of the apparatus; a transverse driving shaft for the propelling members, said shaft having bearings in the longitudinal trusses; and outriggers carried by the superstructure having bearings for the outer ends of the driving shaft.

2. Apparatus of the character described, including: a main base; a machinery supporting superstructure mounted thereon with longitudinal trusses; propelling members at the sides of the apparatus; a sectional transverse driving shaft for the propelling members comprising a central section with its ends mounted in bearings in the longitudinal trusses and outer sections with their inner ends mounted in said bearings and non-rotatively connected to said central section; and outriggers carried by the superstructure having bearings for the outer ends of the outer sections of the driving shaft.

3. Apparatus of the character described, including: a main base; a machinery supporting superstructure mounted thereon with longitudinal trusses; propelling members at the sides of the apparatus; and a sectional transverse driving shaft for the propelling members comprising a central section with its ends mounted in bearings in the longitudinal trusses and outer sections with their inner ends mounted in said bearings and non-rotatively connected to said central section, the non-rotative connections between the shaft sections being accomplished by non-rotatively mounting the adjacent ends of the shaft sections in rotatable members of the bearings in the longitudinal trusses.

JOHN W. PAGE.